(12) United States Patent
Jang et al.

(10) Patent No.: US 9,931,892 B2
(45) Date of Patent: Apr. 3, 2018

(54) TREAD KERF OF SNOW TIRE

(71) Applicant: HANKOOK TIRE CO., LTD., Seoul (KR)

(72) Inventors: Min Su Jang, Daejeon (KR); Sang Tak Joo, Daejeon (KR); Sung Hee Youn, Seoul (KR)

(73) Assignee: HANKOOK TIRE CO., LTD., Seoul (KR)

( * ) Notice: Subject to any disclaimer, the term of this patent is extended or adjusted under 35 U.S.C. 154(b) by 197 days.

(21) Appl. No.: 14/827,458

(22) Filed: Aug. 17, 2015

(65) Prior Publication Data

US 2016/0052346 A1    Feb. 25, 2016

(30) Foreign Application Priority Data

Aug. 19, 2014  (KR) .................... 10-2014-0107625

(51) Int. Cl.
*B60C 11/12*    (2006.01)
*B60C 11/01*    (2006.01)

(52) U.S. Cl.
CPC .......... *B60C 11/01* (2013.01); *B60C 11/1222* (2013.01); *B60C 2011/1213* (2013.01); *B60C 2011/1227* (2013.01)

(58) Field of Classification Search
CPC ............ B60C 11/1204; B60C 11/1218; B60C 11/1222; B60C 2011/1213; B60C 2011/1227
See application file for complete search history.

(56) References Cited

U.S. PATENT DOCUMENTS

| 4,566,514 A | 1/1986 | Mauk et al. |
| 6,026,875 A * | 2/2000 | Diensthuber ........... B60C 11/12 |
| | | 152/209.2 |
| 6,786,257 B1 * | 9/2004 | Koide ..................... B60C 11/11 |
| | | 152/209.1 |

FOREIGN PATENT DOCUMENTS

| DE | 19543940 | * | 5/1997 |
| EP | 0881103 | * | 12/1998 |
| EP | 0963864 A2 | | 12/1999 |
| FR | 2722145 | * | 1/1996 |
| JP | H11240314 A | | 9/1999 |

(Continued)

OTHER PUBLICATIONS

English machine translation of DE19543940, dated May 1997.*

(Continued)

*Primary Examiner* — Robert C Dye
(74) *Attorney, Agent, or Firm* — Marshall, Gerstein & Borun LLP

(57) ABSTRACT

A tread kerf of a snow tire is capable of securing the performance of the tire on a dry road, a wet road, a snowy road, and an icy road, maintaining uniform rigidity of the block, and improving wear resistance. The tread kerf is formed in the outer surface of a tread block of the snow tire in a depth direction of the block in a shape of a polygonal wave extending along the outer surface of the block, wherein the entrance distance of the polygonal wave is less than the bottom distance of the polygonal wave such that side surfaces between the entrance and the bottom of the polygonal wave are formed as inclined surfaces, the distance between which decreases toward the entrance. The polygonal wave is moved in an advancing direction of the polygonal wave while being twisted in the depth direction of the block.

9 Claims, 7 Drawing Sheets

(56) References Cited

FOREIGN PATENT DOCUMENTS

| JP | 2008-049971 A | 3/2008 |
| JP | 2009202705 A | 9/2009 |
| JP | 2009214697 A | 9/2009 |
| JP | 2010143377 A | 7/2010 |
| JP | 2012528040 A | 11/2012 |
| JP | 2013-103579 A | 5/2013 |
| KR | 2010-0048065 A | 5/2010 |
| WO | WO-2014/068385 A1 | 5/2014 |

OTHER PUBLICATIONS

English machine translation of FR2722145, dated Jan. 1996.*
Office Action issued in Japanese Patent Application No. 2015-160424 dated Aug. 16, 2016.
Office Action issued in Chinese Patent Application No. 201510511115.1 dated Nov. 15, 2016.
Extended European Search Report issued in European Pat. Appl. No. 15181378.9 dated Dec. 14, 2015.
Office Action issued in European Patent Application No. 15181378.9, dated Mar. 29, 2017.

* cited by examiner

TREAD KERF OF SNOW TIRE

CROSS-REFERENCE TO RELATED APPLICATION

This U.S. patent application claims the benefit of priority under 35 U.S.C. § 119 of Korean Patent Application No. 10-2014-0107625, filed Aug. 19, 2014, the entire contents of which is hereby incorporated by reference for all purposes.

TECHNOLOGICAL FIELD

The present disclosure relates to a tread kerf of a snow tire, and more particularly to a tread kerf of a snow tire that is capable of securing the performance of the tire on a dry road and a wet road while additionally securing the performance of the tire on a snowy road and an icy road, maintaining uniform rigidity of the block, and improving wear resistance.

BACKGROUND

In general, a tire is one of the components constituting a vehicle. The tire directly contacts a road surface. Air in the tire absorbs shocks like a spring. Specifically, the air in the tire absorbs shocks generated due to irregularity of the road surface to improve comfort in driving of the vehicle.

The tire includes a tread, which is a rubber layer that contacts the road surface, a sidewall connected to the tread, the sidewall constituting a side surface of the tire, a bead connected to the sidewall, the bead being fixed to a rim of each wheel of the vehicle, a carcass mounted in the tire, the carcass forming a framework of the tire and exhibiting high fatigue resistance to bending and stretching of the sidewall, and a belt disposed between the tread and the carcass for protecting the carcass and improving the rigidity of the surface of the tread. The tread includes a block and a groove. A kerf is formed in the block. The rigidity of the block is appropriately adjusted by the kerf so as to satisfy the requirements of the tire.

A snow tire is a tire manufactured to have better braking, steering, and traction performance than a general tire while traveling on a snowy road or an icy road in the winter. While traveling on a snowy road or an icy road, grip force is maintained in driving, braking, and cornering due to the edge effect of the kerf.

In a general snow tire, sub blocks constituting a block are separated from each other by a tread kerf formed in each sub block. As a result, the interconnection between the sub blocks is lost, whereby rigidity of the block is lowered. That is, interconnection between the sub blocks is lost in a direction normal to a center line of the kerf, whereby the rigidity of the block is lowered. During the movement of the tire, therefore, the sub blocks of the tread partitioned by the kerf excessively fall, and a leading portion of the tire is rolled. As a result, frictional force between the tire and the road surface is reduced. Consequently, the performance of the tire is lowered when driving, braking, and cornering on a dry road and a wet road. In addition, the wear resistance of the tire is lowered.

Three-dimensional kerfs that maintain the rigidity of a tread block based on interconnection between the sub blocks achieved by the kerf in a direction normal to the surface of a tire are disclosed in Korean Registered Patent No. 10-0913597 and Japanese Patent Application Publication No. 2011-991. However, the conventional three-dimensional kerfs do not exhibit desired rigidity. For this reason, there is a high necessity for a new type of three-dimensional kerf.

FIG. 7 is a perspective view schematically showing a block having a conventional three-dimensional kerf formed therein. As shown, a block 10 is provided at the middle of a top surface 11 thereof with a zigzag wave-shaped three-dimensional kerf 12, which is formed in a depth direction (a z-axial direction) of the block 10 to divide the block 10 into sub blocks 10a and 10b. When force is applied to the three-dimensional kerf 12 in directions indicated by arrows A during traveling on a tire, as shown in FIG. 7, the rigidities of the sub blocks differ from each other due to the three-dimensional kerf 12 in a direction in which the tire moves as shown in FIG. 8. As a result, the effect of interlocking between the sub blocks is low, and locking force is concentrated at one or two points (the interlocking force is indicated by arrows B).

SUMMARY OF THE DISCLOSURE

Therefore, present embodiments are described in view of the above problems, and it is an object of the presently described embodiments to provide a tread kerf of a snow tire that is capable of securing performance (steering, braking, traction, etc.) of the tire on a dry road and a wet road while additionally securing the performance of the tire on a snowy road and an icy road.

It is another object of the presently described embodiments to provide a tread kerf of a snow tire that is capable of maintaining more uniform rigidity of the block irrespective of the directionality of the kerf, increasing the interlocking effect, and maintaining uniform traction performance of the tire even when the tire is severely worn.

In accordance with an aspect of the present disclosure, the above and other objects can be accomplished by the provision of a tread kerf formed in the outer surface of a tread block of a snow tire in a depth direction of the block in the shape of a polygonal wave extending along the outer surface of the block, wherein the entrance distance of the polygonal wave is less than the bottom distance of the polygonal wave such that side surfaces between the entrance and the bottom of the polygonal wave are formed as inclined surfaces, the distance between which decreases toward the entrance, such that, when force is applied to sub blocks, which are separated from each other by the kerf, the sub blocks are locked with each other in axial directions perpendicular to the outer surface of the block.

The polygonal wave may be twisted in the depth direction of the block. The polygonal wave may be moved in an advancing direction of the polygonal wave while being twisted in the depth direction of the block. A wave twisting angle, which is generated as the polygonal wave is twisted, may be 60 degrees or less. Inclined surface twisting angles, which are generated as the polygonal wave is twisted, may be 45 degrees or less.

The amplitude of the twisted polygonal wave at the outer surface of the block may be equal to or less than the amplitude of the twisted polygonal wave at the end surface of the block in the depth direction of the block. The amplitude of the twisted polygonal wave at the outer surface of the block may be 0.5 to 4.0 mm, and the amplitude of the twisted polygonal wave at the end surface of the block may be 0.5 to 8.0 mm.

Meanwhile, a kerf member, made of a metal material or a plastic material, which has a shape corresponding to that of the tread kerf, may be fitted in the tread kerf of the snow tire according to the present disclosure.

BRIEF DESCRIPTION OF THE DRAWINGS

The above and other objects, features and other advantages of the presently described embodiments will be more clearly understood from the following detailed description taken in conjunction with the accompanying drawings, in which.

DETAILED DESCRIPTION

Figure 1:
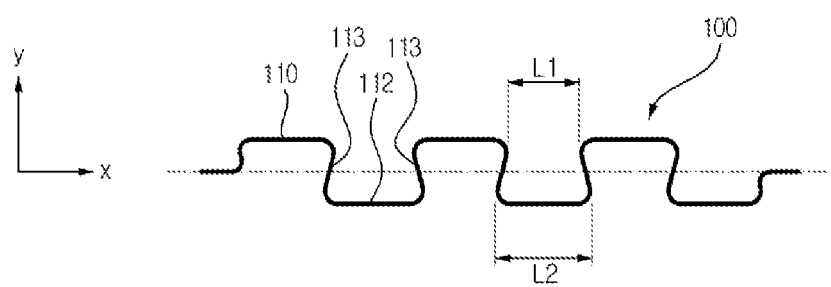
FIG. 1 is a view schematically showing the shape of a tread kerf according to an embodiment (a plan view showing the kerf on the outer surface of a block)

Reference will now be made in detail to the preferred embodiments presently described, examples of which are illustrated in the accompanying drawings. Wherever possible, the same reference numbers will be used throughout the drawings to refer to the same or like parts. In addition, a detailed description of known functions and configurations incorporated herein will be omitted when it may make the subject matter of the present invention rather unclear. In the drawings, some components are exaggerated, omitted, or schematically shown for the same reason.

Figure 2:
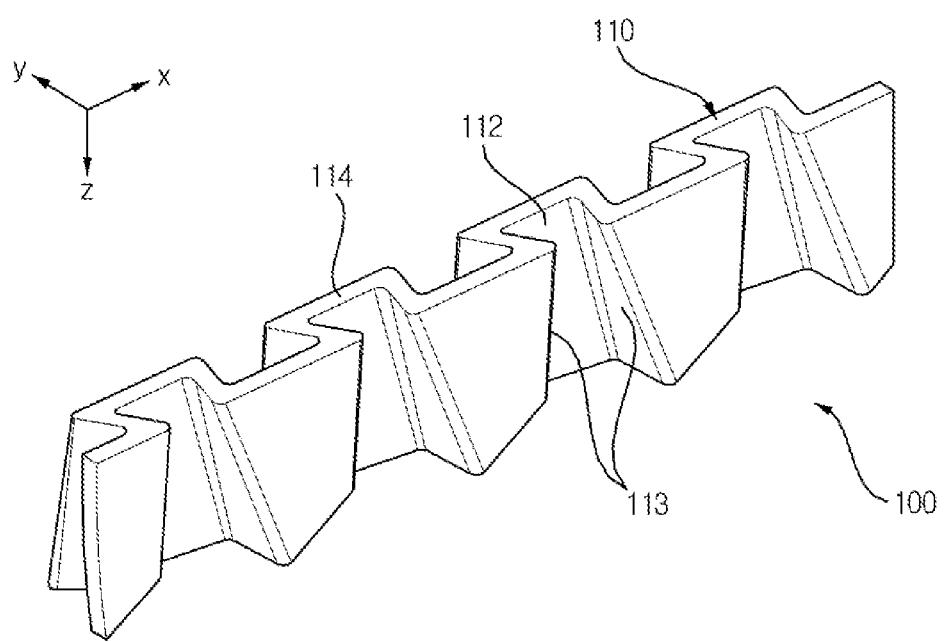
FIG. 2 is a perspective view showing the top surface of the tread kerf according to the embodiment.
Figure 7:
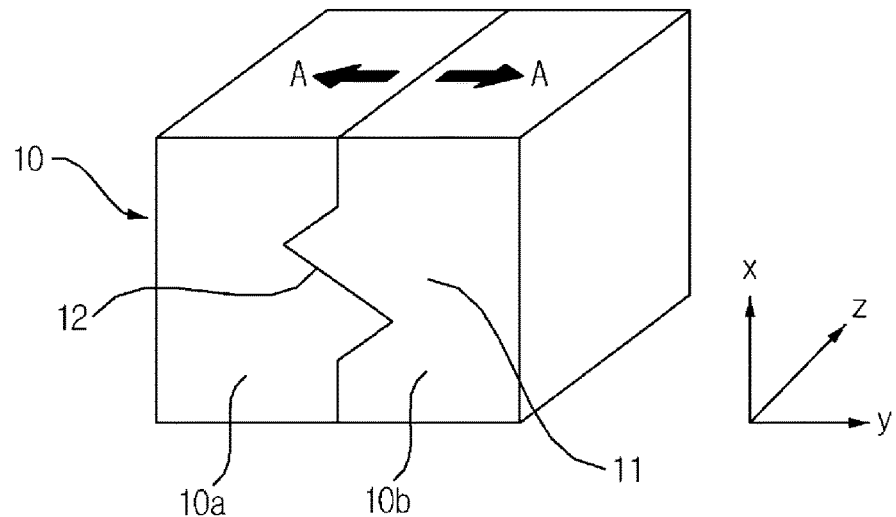
FIG. 7 is a perspective view schematically showing a block having a conventional three-dimensional kerf formed therein.
Figure 8:
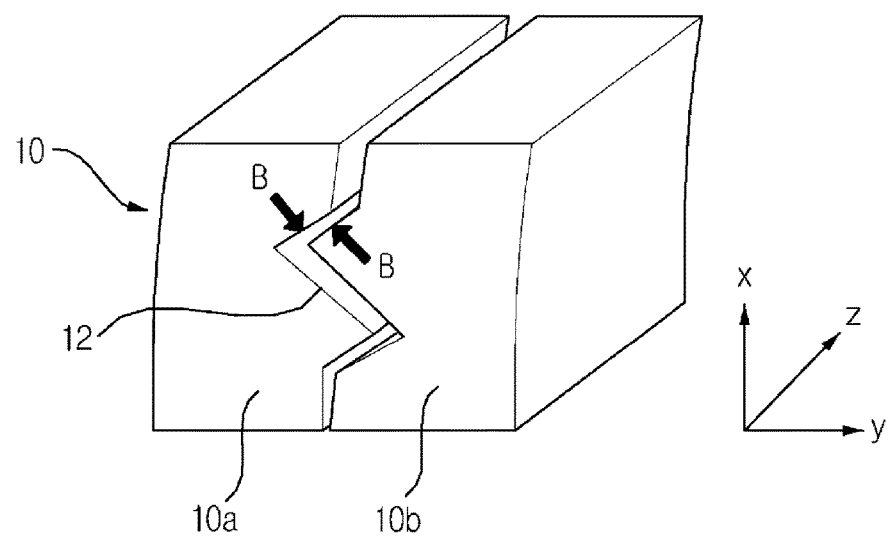
FIG. 8 is a view illustrating a state in which sub blocks are deformed and then locked with each other due to force applied while travelling on a tire in FIG. 7.

FIG. 1 is a view schematically showing the shape of a tread kerf according to an embodiment (a plan view showing the kerf on the outer surface of a block), and FIG. 2 is a perspective view showing the top surface of the tread kerf according to the embodiment. As shown, a tread kerf 100 according to an embodiment is formed in the outer surface of a tread block (see FIG. 7) in a depth direction (a z-axial direction) of the block in the shape of a trapezoidal wave 110 extending along the outer surface of the block (an x-y axis plane).

In this embodiment, the tread kerf 100 is formed in the shape of a trapezoidal wave 110. Alternatively, the tread kerf 100 may be formed in the shapes of polygonal waves having various shapes. Hereinafter, the tread kerf 100 will be described as being formed in the shape of a trapezoidal wave 110 by way of example as in this embodiment. In addition, in the drawings, the tread kerf 100 is shown as a member. In reality, however, the tread kerf 100 is a groove formed in a tread block of a tire.

The trapezoidal wave 110 is formed in the tread block in a circumferential direction (an x-axial direction) of the tire. Alternatively, the trapezoidal wave 110 may be formed in a width direction (a y-axial direction) of the tire, or may be formed in a direction inclined with respect to the x axis and the y axis. An entrance distance L1 of the trapezoidal wave 110 is less than a bottom distance L2 of the trapezoidal wave 110 such that side surfaces between an entrance 111 and a bottom 112 of the trapezoidal wave 110 are formed as inclined surfaces 113, the distance between which decreases toward the entrance. When force is applied to sub blocks, which are separated from each other by the kerf, therefore, the sub blocks are engaged with each other in the axial directions (the x-axial direction and the y-axial direction), perpendicular to the outer surface of the block, with the result that the sub blocks are locked with each other. The inclined surfaces 113 and the bottom are connected to each other in a curved fashion so as to provide round corners. Alternatively, the inclined surfaces 113 and the bottom may be connected to each other so as to provide angled corners.

Since the entrance distance L1 of the trapezoidal wave 110 is less than the bottom distance L2 of the trapezoidal wave 110 such that the side surfaces between the entrance 111 and the bottom 112 of the trapezoidal wave 110 are formed as inclined surfaces 113 as described above, the sub blocks are smoothly locked with each other in the y-axial direction. As a result, the rigidity of the block is increased, whereby it is possible to improve performance of the tire on a dry road and a wet road. In particular, the rigidity of the block is increased when the tire is driven or braked in a travel direction of the tire, whereby it is possible to improve the braking performance of the tire. In addition, since the trapezoidal wave having inclined surfaces or the polygonal wave having inclined surfaces increases the total length of the kerf in consideration of the shape of the kerf, the edge effect of the kerf is improved, whereby it is possible to improve the performance of the tire on both a snowy road and an icy road.

Figure 5:
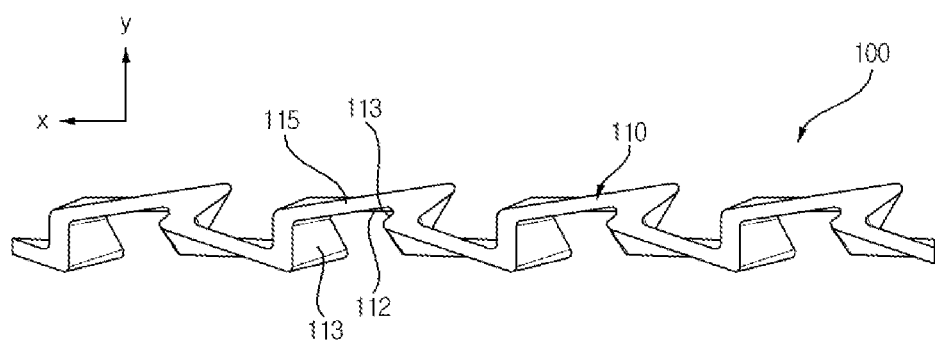
FIG. 5 is a rear view showing the bottom surface of the tread kerf of FIG. 2.

The trapezoidal wave 110 is twisted in the depth direction (the z-axial direction) of the block. The trapezoidal wave 110 is moved in an advancing direction (an x-axial direction) of the wave while being twisted in the depth direction (the z-axial direction) of the block. FIG. 5 is a rear view showing the bottom surface of the tread kerf in a state in which the trapezoidal wave 110 is twisted, and FIG. 6 is a view illustrating a state in which the trapezoidal wave 110 of the tread kerf is twisted.

Figure 6:
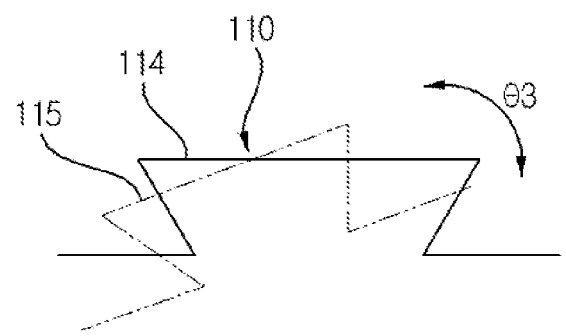
FIG. 6 is a view illustrating a state in which a trapezoidal wave of the tread kerf according to the embodiment is twisted.

A wave twisting angle $\theta 3$, which is generated as the trapezoidal wave 110 is twisted from a top surface 114 of the kerf shown in FIG. 2 to a bottom surface 115 of the kerf shown in FIG. 5, may be 60 degrees or less (see FIG. 6). The wave twisting angle $\theta 3$ is an angle required to twist sub blocks, thereby achieving the interconnection between the sub blocks in the depth direction of the sub blocks. The wave twisting angle $\theta 3$ is set in consideration of the fact that the tire must have a shape such that the tire can be withdrawn from a mold during a tire manufacturing process. The wave twisting angle $\theta 3$ is not particularly restricted so long as the wave twisting angle $\theta 3$ is 60 degrees or less.

Figure 3:
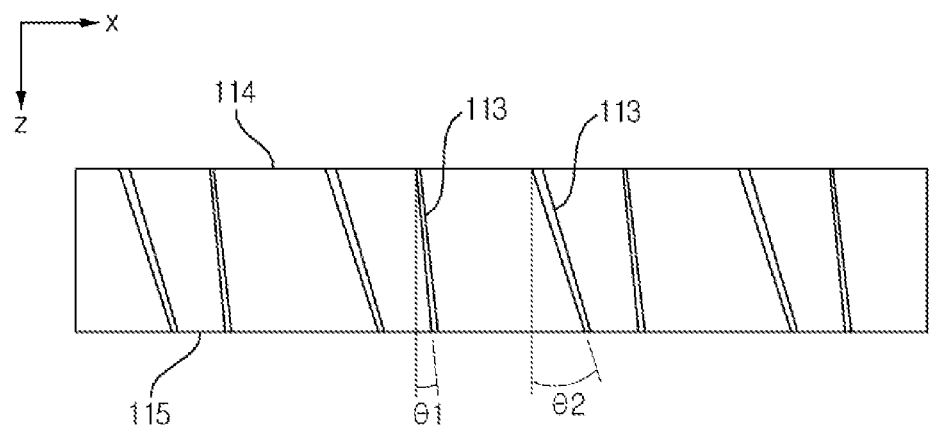
FIG. 3 is an elevation view of FIG. 2.

In addition, inclined surface twisting angles $\theta 1$ and $\theta 2$, which are generated as the trapezoidal wave 110 is twisted, may be 45 degrees or less (see FIG. 3). The inclined surface twisting angles $\theta 1$ and $\theta 2$ are angles required to twist the sub blocks, thereby achieving the interconnection between the sub blocks in the depth direction of the sub blocks. The inclined surface twisting angles $\theta 1$ and $\theta 2$ are set in consideration of the fact that the tire must have a shape such that the tire can be withdrawn from a mold during a tire manufacturing process. The inclined surface twisting angles $\theta 1$ and $\theta 2$ are not particularly restricted so long as the inclined surface twisting angles $\theta 1$ and $\theta 2$ are 45 degrees or less.

When the wave 110 is twisted in the depth direction (the z-axial direction) of the block as described above, the sub blocks are locked with each other in the depth direction of the sub blocks during the movement of the tire, thereby minimizing the movement of the sub blocks. In addition, desired rigidity of the block is easily achieved, thereby improving wear resistance and restraining an abnormal wear phenomenon.

Figure 4:
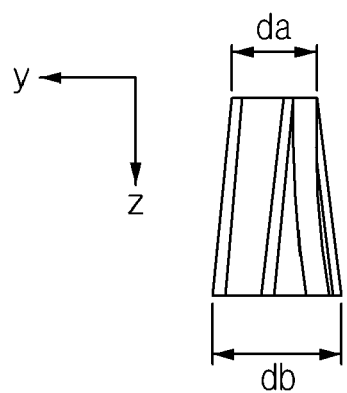
FIG. 4 is a side view of FIG. 2.

An amplitude da/2 of the twisted trapezoidal wave at the outer surface (the top surface) 114 of the block is equal to or less than an amplitude db/2 of the twisted trapezoidal wave at the end surface (the bottom surface) 115 of the block in the depth direction of the block (see FIG. 4). The amplitude da/2 of the twisted trapezoidal wave at the outer surface of the block may be 0.5 to 4.0 mm, and the amplitude db/2 of the twisted trapezoidal wave at the end surface of the block may be 0.5 to 8.0 mm. In FIG. 4, a top surface width da and a bottom surface width db of the kerf indicate the maximum widths of the twisted trapezoidal wave over adjacent waves, as shown as the bottom surface 115 of the kerf in FIG. 5.

In a case in which the amplitude da/2 of the twisted trapezoidal wave at the outer surface (the top surface) 114 of the block is less than the amplitude db/2 of the twisted trapezoidal wave at the end surface (the bottom surface) 115 of the block in the depth direction of the block as described above, it is possible to further improve the effect of interlocking between the sub blocks due to engagement between the sub blocks.

In the tread kerf of the snow tire with the above-stated construction according to the present invention, it is possible to secure uniform rigidity of the block irrespective of directions of the surfaces of the kerf. In addition, the inclined surfaces and the bottom surfaces of the wave are twisted in the depth direction of the block. As a result, the effect of interlocking between neighboring waves is considerably improved, whereby it is possible to secure more uniform rigidity of the block and to maximize the interlocking effect at the large surfaces. Consequently, it is possible to optimize falling of the sub blocks of the tread of the tire, thereby securing performance of the tire on a dry road and, in addition, securing uniform traction performance of the tire even when the tire is severely worn. Furthermore, it is possible to increase the total length of the kerf in consideration of the shape of the kerf, thereby improving the edge effect of the kerf and thus improving performance of the tire on both the snowy road and the icy road.

Meanwhile, a kerf member, made of a metal material or a plastic material, which has a shape corresponding to that of the tread kerf 100, may be fitted in the tread kerf 100 of the snow tire according to the present invention. The kerf member may be formed by molding or machining a metal material, or alternatively a plastic material that exhibits high thermal resistance and flexibility may be used to form the kerf member.

As is apparent from the above description, in the tread kerf of the snow tire according to the presently described embodiments, it is possible to optimize falling of the sub blocks of the tread during the movement of the tire, thereby securing performance (steering, braking, traction, etc.) of the tire on a dry road and a wet road while additionally securing the performance of the tire on a snowy road and an icy road.

In addition, it is possible to maintain more uniform rigidity of the block irrespective of the directionality of the kerf, to maximize the interlocking effect at the large surfaces, and to maintain uniform traction performance of the tire even when the tire is severely worn.

In addition, it is possible to increase the total length of the kerf in consideration of the shape of the kerf, thereby improving the edge effect of the kerf and thus improving the performance of the tire on both the snowy road and the icy road.

Although the preferred embodiments presently described have been disclosed for illustrative purposes, those skilled in the art will appreciate that various modifications, additions and substitutions are possible, without departing from the scope and spirit of the disclosure.

What is claimed is:

1. A tread kerf formed in an outer surface of a tread block of a snow tire in a depth direction of the block in a shape of a polygonal wave extending along the outer surface of the block, wherein
    an entrance distance of the polygonal wave is less than a bottom distance of the polygonal wave such that side surfaces between an entrance and a bottom of the polygonal wave are formed as inclined surfaces, a distance between which decreases toward the entrance,
    wherein the polygonal wave is twisted in the depth direction of the block, and
    wherein an amplitude of the twisted polygonal wave at the outer surface of the block is less than an amplitude of the twisted polygonal wave at an end surface of the block in the depth direction of the block.

2. The tread kerf according to claim 1, wherein a wave twisting angle, which is generated as the polygonal wave is twisted, is 60 degrees or less.

3. The tread kerf according to claim 1, wherein inclined surface twisting angles, which are angles of inclined surface with respect to the depth direction of the block generated as the polygonal wave is twisted, are 45 degrees or less.

4. The tread kerf according to claim 1, wherein the amplitude of the twisted polygonal wave at the outer surface of the block is 0.5 to 4.0 mm, and the amplitude of the twisted polygonal wave at the end surface of the block is 0.5 to 8.0 mm.

5. The tread kerf according to claim 1, wherein the polygonal wave is moved in an advancing direction of the polygonal wave while being twisted in the depth direction of the block.

6. The tread kerf according to claim 5, wherein a wave twisting angle, which is generated as the polygonal wave is twisted, is 60 degrees or less.

7. The tread kerf according to claim 5, wherein inclined surface twisting angles, which are angles of inclined surface with respect to the depth direction of the block generated as the polygonal wave is twisted, are 45 degrees or less.

8. The tread kerf according to claim 5, wherein the amplitude of the twisted polygonal wave at the outer surface of the block is 0.5 to 4.0 mm, and the amplitude of the twisted polygonal wave at the end surface of the block is 0.5 to 8.0 mm.

9. A tread kerf member fitted in a tread block of a snow tire in a depth direction of the block in a shape of a polygonal wave extending along an outer surface of the block, wherein
    an entrance distance of the polygonal wave is less than a bottom distance of the polygonal wave such that side surfaces between an entrance and a bottom of the polygonal wave are formed as inclined surfaces, a distance between which decreases toward the entrance,
    wherein the tread kerf member is used as a kerf structure in the snow tire,
    wherein the polygonal wave is twisted in the depth direction of the block, and
    wherein an amplitude of the twisted polygonal wave at the outer surface of the block is less than an amplitude of the twisted polygonal wave at an end surface of the block in the depth direction of the block.

* * * * *